US011189097B2

(12) United States Patent
Coghlan et al.

(10) Patent No.: US 11,189,097 B2
(45) Date of Patent: Nov. 30, 2021

(54) SIMULATED REALITY TRANSITION ELEMENT LOCATION

(71) Applicant: IN IT VR, LLC, New York, NY (US)

(72) Inventors: Katelyn Coghlan, South Orange, NJ (US); Brennan John McTernan, Fanwood, NJ (US); Liron Lerman, Maplewood, NJ (US)

(73) Assignee: IN IT VR, LLC, New York, NY (US)

( * ) Notice: Subject to any disclaimer, the term of this patent is extended or adjusted under 35 U.S.C. 154(b) by 0 days.

(21) Appl. No.: 16/901,830

(22) Filed: Jun. 15, 2020

(65) Prior Publication Data

US 2020/0394840 A1    Dec. 17, 2020

Related U.S. Application Data

(60) Provisional application No. 62/861,750, filed on Jun. 14, 2019.

(51) Int. Cl.
*G06T 15/00* (2011.01)
*G06T 19/00* (2011.01)

(52) U.S. Cl.
CPC .......... *G06T 19/003* (2013.01); *G06T 19/006* (2013.01)

(58) Field of Classification Search
CPC ............................. G06T 19/003; G06T 19/006
See application file for complete search history.

(56) References Cited

U.S. PATENT DOCUMENTS

| 2008/0134056 | A1* | 6/2008 | Shuster | A63F 13/40 |
| | | | | 715/757 |
| 2010/0070859 | A1* | 3/2010 | Shuster | A63F 13/79 |
| | | | | 715/706 |
| 2017/0228931 | A1* | 8/2017 | Parker | G02B 27/017 |
| 2018/0061127 | A1* | 3/2018 | Gullicksen | G06F 3/0383 |
| 2019/0005717 | A1* | 1/2019 | Singh | G06F 3/04815 |
| 2019/0102941 | A1* | 4/2019 | Khan | G06T 19/003 |

\* cited by examiner

*Primary Examiner* — Charles Tseng
(74) *Attorney, Agent, or Firm* — Fox Rothschild LLP

(57) ABSTRACT

Systems and methods for presenting simulated reality (SR) relative to a user's position are disclosed. The system includes a camera, a memory, and a processor. The processor is configured to determine a position of a SR layer relative to a location indicator. The SR layer defines a position of a SR transition element that allows a user to transition between a first environment and a second environment. The processor is further configured to receive a location input that locates the user relative to the location indicator, use the location input to display the SR transition element at the position, determine a user interaction with the SR transition element, and based on the determined user interaction, display to the user the first environment, the second environment, or a combination thereof.

19 Claims, 6 Drawing Sheets

SIMULATED REALITY TRANSITION ELEMENT LOCATION

CROSS-REFERENCE TO RELATED APPLICATION

This application claims priority to U.S. Provisional Application No. 62/861,750, filed on Jun. 14, 2019, the disclosure of which is incorporated by reference herein in its entirety.

FIELD

The present invention relates to systems and methods for establishing a preset location of a simulated reality (SR) experience in physical space.

BACKGROUND

A simulated reality (SR) experience provides a three-dimensional (3D) representation of a real or simulated world. Simulated reality encompasses both augmented reality and virtual reality. In an augmented reality experience, a user device receives live image content of a real world environment, and an augmented reality image object is overlaid on the real world environment for display. In a virtual reality experience, a user device receives virtual reality image content of a virtual reality environment, and virtual reality image objects are overlaid on the virtual reality environment for display.

Some virtual reality systems use a portal as a way to present a virtual reality environment to a user. With such systems, the user may place the portal in any location within the surrounding real world environment to provide an entryway to the virtual reality environment. For example, the user may aim a camera of the user device (e.g., a mobile phone) towards a location to capture an image of the location. The user can then place a portal on a display of the user device anywhere on the captured location image. For example, the portal may be a virtual frame presented on a screen of the user device. A user may see a virtual reality world through the virtual frame. As the user walks towards the portal, the portal appears larger until the user can walk through the portal and enter the virtual reality world. Upon walking through the portal, the user is surrounded by the virtual reality world and can move the user device around to see different areas of the surrounding virtual reality environment. In some systems, the user can turn around and see the portal from the other side. In other words, the user can see through the portal back into the real world environment. The user can walk back through the portal and into the real world environment (e.g., the user views the real world environment again through the camera on the user device).

Such conventional virtual portals used with virtual reality systems have an arbitrary position in the real world environment and are dependent on a user taking action before the portal and the virtual reality world can be presented to the user.

There is a need for a SR system that provides a SR experience at a preset and/or fixed position in physical space without user interference.

The information included in this Background section of the specification, including any references cited herein and any description or discussion thereof, is included for technical reference purposes only and is not to be regarded subject matter by which the scope of the invention as defined in the claims is to be bound.

SUMMARY

Disclosed is a system for providing a SR experience in a preset location in physical space. The system provides a relationship and orientation for presenting SR relative to a user's position. The system may include a camera. The system may also include a non-transitory memory containing computer readable instructions. The system may also include a processor configured to process the instructions to carry out steps for providing a relationship and orientation for presenting SR relative to a user's position. The steps can include determining a position of a SR layer relative to a location indicator. The SR layer may define a position of a SR transition element that allows a user to transition between a first environment and a second environment. The steps may also include receiving a location input that locates the user relative to the location indicator, using the location input to display the SR transition element at the position, determining a user interaction with the SR transition element, and displaying to the user the first environment and/or the second environment based on the determined user interaction. The position of the SR transition element in the SR layer, as experienced by the user, may remain fixed when the user moves with respect to the SR transition element or through the SR transition element by changing positions in the SR layer.

The user interaction may include the user looking though the SR transition element such that the user can see the second environment while being positioned in the first environment. Optionally, more assets can be displayed in the second environment on one side of the SR transition element compared to the first environment on an opposing side of the transition element. The first environment may be displayed as the real world environment with no assets being displayed and the second environment may be displayed as the SR environment with multiple assets being displayed. The user interaction can also include the user passing through the SR transition element.

The user can interact with more assets in the second environment on one side of the SR transition element compared to the first environment on an opposing side of the transition element after passing through the SR transition element. Optionally, displaying the SR transition element may include displaying a first environment external to the SR transition element and a second environment internal to the SR transition element. In such scenarios, displaying to the user the first environment, the second environment, or the combination thereof based on the determined user interaction may include displaying the first environment internal to the SR transition element and the second environment external to the SR transition element giving the user an impression that passing through the SR transition element has transitioned SR environments.

Using the location input to display the SR transition element at the position may include determining a relative location of the user with respect to the position of the SR transition element, and using the relative location to determine one or more properties of the SR transition element for display.

Optionally, the SR layer may also define positions of a plurality of assets in a SR environment.

The location indicator may be a real world feature and the determined position of the SR layer relative to the real world feature may be used to determine a location of the SR transition element with respect to the real world feature.

Additionally and/or alternatively, the position of the SR layer relative to the location indicator may be determined by receiving SR layer data from a user.

The location indicator input may be based on the user's position relative to a localized location indicator that has predetermined positions in a real world environment and relative to the SR layer. Optionally, the location indicator input may be based on the user's position relative to one or more wide range location indicators and/or global positioning system data received from a user device.

The steps may also include determining positions of a plurality of SR assets relative to the location indicator based on the position of the SR layer relative to the location indicator, and displaying the SR assets to the user at the determined positions. Optionally, the steps may include determining, based on the position of the SR layer relative to the location indicator, a position of the SR transition element relative to the location indicator, and displaying the SR transition element to the user at the determined position. The steps may also include determining a relative location of the user with respect to the position of the SR transition element, and using the relative location to determine one or more properties of the SR transition element for display.

This Summary is provided to introduce a selection of concepts in a simplified form that are further described below in the Specification. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

DETAILED DESCRIPTION

Figure 1:
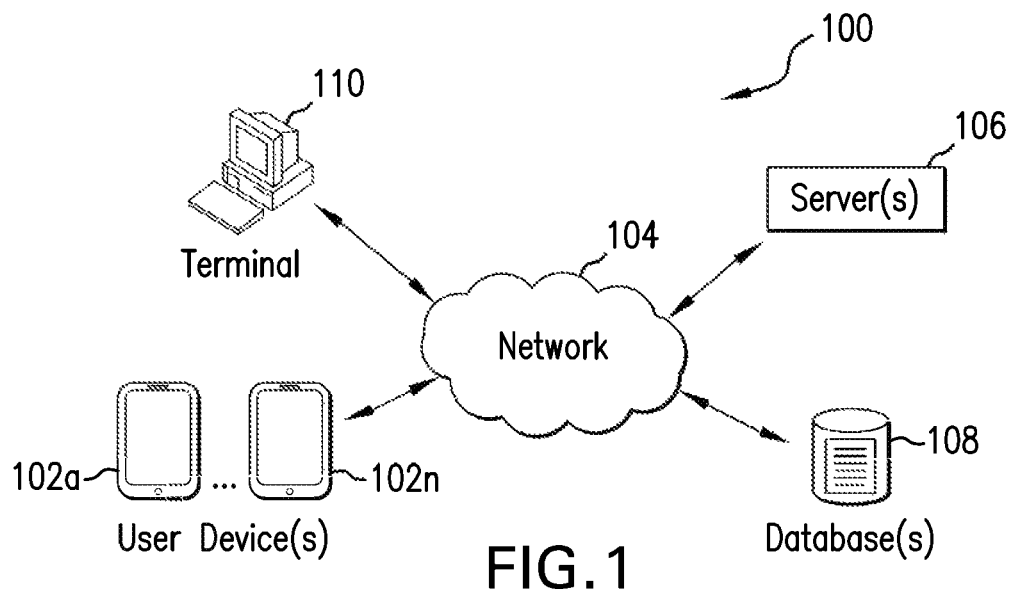
FIG. 1 illustrates a diagram of an example system for presenting a SR experience to a user based on a user's position relative to a SR transition element, according to an embodiment.

Systems and methods are disclosed herein suitable for displaying SR (SR) environments. The system and methods also display SR assets relative to specific locations relative to a user's position and movements therein. The assets may comprise transition elements (i.e., portals), media assets, and decorative assets. The SR assets include SR transition elements (herein referred to as an SR transition element) having a preset location (e.g., relative to a SR layer and/or the physical space). The media assets could be any of text, image, video, audio, 3D objects or other consumable information-based data. Decorative assets are similar in type to media assets, the difference being that role of the assets in the environments is more cosmetic than content intended to communicate some information and may include, without limitation, simulated walls, furniture, trees, or other objects.

The SR transition element provides means that a user (and/or a user's avatar) can use to access and/or view a SR experience and/or transition between SR experiences. For example, interaction with an SR transition element may transition a user from a real world experience (e.g. no display of SR assets) to a SR experience or from one SR experience (i.e., a display of a first set of SR assets) to another SR experience (i.e., a display of a second set of SR assets) when the user (and/or a user's avatar) passes through or otherwise interacts with the transition element.

The transition element may be invisible to a user but allows for a visual or an interactive transition to or between SR environments. In such an example, the SR environment may be displayed after or when the user passes through the invisible SR transition element. Alternatively and/or additionally, the asset may appear as a frame (e.g., a portal, window, door, etc.), shape, image, or other configurations suitable to serve as a visible transition for the user. In some embodiments, the SR transition element can be an entryway that provides access to the SR environment from the real world experience and/or from another SR environment (e.g., the SR transition element acts as a door to the SR environment). In another example, the SR transition element provides a way to view the SR environment (e.g., the SR transition element acts as a window to the SR environment) by looking through the region that the SR transition element occupies. In yet another example, the SR transition element may be in the form of a surface that when touched transitions a user from to the SR environment from the real world experience and/or from another SR environment.

A SR environment is also referred to herein as a SR experience. A user may interact with an SR environment by controlling the actions of a virtual being, also known as an "avatar." The avatar may be a visible and/or audible representation of the user in the simulated environment, and may represent the "body" (in any shape or form) of the user as s/he moves through the simulated environment. Avatars may be able to mimic the actions of real physical people (i.e., users) in a variety of ways, such as by looking in different directions, moving to different locations, entering buildings, handling objects, and even interacting with other avatars in the SR environment.

The layout of an SR layer may define the position of the SR assets that makeup the SR environment or environments as experienced by the user. The SR environment or environments can be displayed on two-dimensional (2D) devices such as computer screens, mobile devices, or other suitable 2D displays. SR environment or environments can also be displayed in 3D such as on a 3D display or hologram. Examples of SR include virtual reality (VR), augmented reality (AR), mixed reality (MR) and traditional 3D representations on a 2D display having virtual assets. SR systems immerse users in environments that are either partially or entirely simulated. In AR environments, users interact with real world information via input sensors on the device, providing a partially simulated environment. In VR environments, the user is fully immersed in a 3D simulated world. Each type of SR system may have objects or assets that are simulations of (i.e., corresponds to) real world items, objects, places, people, or similar entities. The assets or conditions can also provide feedback through haptics, sound or other suitable methods. The SR assets may have positions relative to one another, defining the SR layer. In other words, the SR layer may define the position of one or more SR assets. For example, the SR layer may define the position of an SR transition element.

Since the SR transition element can allow a user to transition to a SR experience or between SR experiences, a first composition of assets and the layout of the assets in a first SR layer on one side of the SR transition element is different from a second composition of assets and the layout of the assets in a second SR layer on another side of the SR transition element may differ from each other. In such examples, the SR transition element allows a user to transition to an SR layer from a real world experience or between two SR layers corresponding to different SR environments. Optionally, a single SR layer may include assets for providing more than one SR experiences distinguished by SR transition element(s).

The SR layer may have a position relative to a location indicator (discussed below). Examples of a location indicator can include physical components configured to provide location feedback, mapping of a physical space, real world features, physical objects in a physical space, etc., or combinations thereof.

For example, a location indicator may be any physical component configured to provide location feedback. Such location feedback providers can be localized location indicators and/or wide area location indicators. For example, as discussed in more detail below, a localized location indicator may be one or more markers, beacon devices, and the like. These devices utilize line of sight or short range signals interacting with the user within the immediate area of the indicator. In some examples, the location indicator can be a wide area indicator. Wide area indicators can include devices such as WiFi routers, satellites, radios, and the like. These devices utilize the ability to communicate with the user from a distance. The user and the wide area indicator do not need to be in the same immediate area. In these embodiments, the SR layer may define a location of a various SR assets (e.g., an SR transition element), such that the SR assets have a position relative to the location indicator (e.g., based on the position of the SR layer relative to the location indicator).

The location indicator may be a mapping of a physical space (e.g., a grid, coordinates, etc.) using which the SR layer may be overlaid relative to a real world environment. In such embodiments, the SR environment is mapped to a physical space. For example, a SR layer may be overlaid relative to the physical space by a coordinate system or grid.

A location indicator may be real world features and a SR layer may be mapped to real world features. For example, a SR floor plan including SR assets (e.g., simulated walls, aisles, etc.) may be overlaid on a physical space having physical or real world features (e.g., walls, aisles, etc.) that correspond to the SR assets. The SR floor plan may be mapped to the physical space by a coordinate system or grid and/or based on corresponding features/assets in both environments. In these examples, the SR layer may define the location of an SR transition element, such that the SR transition element has a position relative to the physical space (e.g., based on the position of the SR layer relative to the physical space). As one example, the SR transition element may be mapped to a specific defined location in the physical space.

As described below, the SR transition element has a position relative to the SR layer and, hence, to the location indicator. Optionally, the SR transition element may also have a position relative to a specific physical object in the physical space. In some embodiments, the physical object may be fixed. For example, the SR transition element may have a position relative to a specific structural real-world feature (e.g., a wall, doorframe, window, etc.). In these embodiments, the disclosed system may use image recognition to detect the specific object. For example, an image of an object may be captured, processed, and compared to SR data (SR data) stored by the system. Based on this comparison, the system may determine an SR transition element associated with the object and the specific position of the SR transition element relative to the physical object (e.g., based on stored information on the position of the SR transition element relative to the object).

The position of the SR transition element can be stored as SR data by the system. For example, the position of the SR transition element in the SR layer may be stored. In the example, where a SR layer is positioned relative to a location indicator, as the SR transition element is located in the SR layer it also has specific location relative to the location indicator. In the example where a SR layer is overlaid relative to the real world environment with a coordinate system or grid, the SR transition element may have a specific location within the coordinate system or grid. In the example where a SR floor plan is mapped to the physical space, the SR transition element may have a position within the SR floor plan relative to the SR assets. In some embodiments, the position of the SR transition element relative to a specific object in the physical space is stored as SR data.

The SR system may determine a user's location relative to the SR transition element. For example, the system may determine a user's location relative to one or more location indicators and/or other methods within the physical. In some embodiments, the disclosed system receives location information from a user device. For example, the user device may include navigational components suitable for wide area location indicators (e.g., a global positioning system (GPS)) that track a user's position in physical space. In some embodiments, the disclosed system utilizes location indicators to determine a user's position. An example of this is an image recognition system that determines the user's position. For example, the system may use markers to determine the user's position. As one example, the system may use the marker-based positioning system disclosed in U.S. application Ser. No. 16/856,916, filed Apr. 23, 2020 entitled "Marker-Based Positioning of Simulated Reality," that claims priority to Provisional U.S. Application No. 62/837,559, filed Apr. 23, 2019, which are hereby incorporated herein by reference in their entirety. Based on the determined position of the user, the position of the SR layer, and the defined location of the SR transition element in the SR layer, the system can determine the user's position relative to the SR transition element (and the associated SR environment).

By using an SR transition element with a preset location (e.g., via a defined position of the SR transition element in a SR layer having a predetermined position relative to a location indicator), the system enables creators of a SR environment to determine exactly how and where the SR environment will be displayed without interference by other users. Furthermore, an SR environment creator may be able to position various assets including transition elements in an SR layer relative to each other without actually having to map the actual physical space. The SR layer may then simply be overlaid over the physical space at any time relative to the location indicator such that the position of the transition element within the SR layer remains fixed relative to other SR assets.

For example, the positioning of the SR environment and the SR transition element relative to a physical space may be important to an advertising/marketing company that seeks to properly target a particular audience. For example, the position of the SR transition element can be set a particular distance from a product display (which may act as a location indicator) so that a user viewing or passing through the SR transition element sees certain SR assets (e.g., a commercial, slogan, animated mascot, flashing arrow, etc.) that focus the user's attention towards the product display. In some embodiments, the relative position of the SR transition element in physical space may be fixed, such that the location may only be changed by an administrator or creator of the SR environment and may not be manipulated by other users. Because the SR transition element may have a preset location independent of user interference, the SR transition element may provide a consistent, reliable position for a SR environment. In particular, the position of the SR transition element can remain fixed even as a user moves around or through the SR transition element. For example, a two dimensional SR transition element (e.g. a two dimensional portal or doorway) has the opening remaining in the same direction as the user moves around it. This allows, for example, the user to see through the transition element when the user is in front of it and slowly lose the view through the portal as the user changes perspective by moving around to the side of the transition element. In this manner, systems and methods disclosed herein increase accuracy and reliability of positioning a SR assets including SR transition elements in the SR layer relative to a location indicator maintaining a specific experience for the user (which may not need reliance on precisely mapping a physical space).

Turning to the figures, systems and methods for presenting SR using an SR transition element with a defined position relative to the real world environment (via the SR layer) will now be discussed. FIG. 1 is a diagram of an SR layer-based SR positioning system 100 for positioning a SR layer relative to one or more user devices 102a-n, and for presenting SR environment content (e.g., assets and transition elements) based on the relative positioning of the SR layer. The user device(s) 102a-n can be any of various types of computing devices, e.g., smart phones, tablet computers, desktop computers, laptop computers, set top boxes, gaming devices, wearable devices (e.g., SR glasses, smart watch, etc.), or the like. The user device(s) 102a-n provides output to and receives input from a user. For example, the user device(s) 102a-n may receive marker information from a user and output positioning information and SR to a user. The SR presentation can be displayed according to various suitable methods, for example, on a display screen of a user device 102, or through a separate headset, focal lens, or other suitable device that is communicatively coupled to the user device 102. The type and number of user devices 102a-n may vary as desired.

The user device(s) 102a-n may include a camera that captures image content. The captured image content can be two-dimensional or three-dimensional. It is contemplated that more than one camera may be used with the present system 100. For example, one camera may be used to detect and scan one or more markers and another camera may be used to navigate through a SR environment that is mapped to the physical environment. The user device(s) 102a-n can communicate with one or more servers 106 via a network 104. The user device(s) 102a-n can communicate with the network 104, for example, by way of a wireless access point, a cellular cite, and/or by other suitable access points, such as Bluetooth or other connections.

The user device(s) 102a-n can have communication interfaces and/or sensors for detecting data that is indicative of a condition attribute of the user device(s) 102a-n. For example, the user device(s) 102a-n can have a global positioning system (GPS) interface that communicates with a GPS satellite to receive information indicative of a geo-location of the user device(s) 102a-n. The user device(s) 102a-n can have a compass, magnetometer, or other sensor for detecting or determining the heading of the user device(s) 102a-n. The user device(s) 102a-n can have an accelerometer, e.g., comprising piezoelectric sensors, for detecting movement of the user device(s) 102a-n. The accelerometer can also indicate tilt of the user device(s) 102a-n, including its pitch, roll, and yaw and position and/or movement about its pitch, roll, and yaw axes. The user device(s) 102a-n can have a barometric pressure sensor or other sensors for detecting an altitude of the user device(s) 102a-n. The user device(s) 102a-n can have a wireless network communication interface and can be configured to detect the proximity of the user device(s) 102a-n to a wireless access point.

The network 104 may be substantially any type or combination of types of communication system for transmitting data either through a wired or wireless mechanism (e.g., WiFi, Ethernet, Bluetooth, cellular data, or the like). In some embodiments, certain components in the system 100 may communicate via a first mode (e.g., Bluetooth) and others may communicate via a second mode (e.g., WiFi). Additionally, certain components may have multiple transmission mechanisms and be configured to communicate data in two or more manners. The configuration of the network 104 and communication mechanisms for each of the components may be varied as desired.

The server(s) 106 includes one or more computing devices that process and execute information. The server(s) 106 may include its own processing elements, memory components, and the like, and/or may be in communication with one or more external components (e.g., separate memory storage) (an example of computing elements that may be included in the server(s) 106 is disclosed below with respect to FIG. 2). The server(s) 106 may also include one or more server computers that are interconnected together via the network 104 or separate communication protocol. The server(s) 106 may host and execute a number of the processes executed by the system 100.

The system 100 stores SR data, for example, in one or more data stores 108. The stored SR data can be uploaded to the data store(s) 108 from one or more user devices 102a-n (e.g., by a SR creator). The stored SR data can include SR transition element data (e.g., SR transition element identification information, specific location of an SR transition element in a SR layer, position relative to a location indicator, position relative to the physical space, specific location in a coordinate system or grid, associated SR layer, and the like), SR layer data (e.g., positioning or mapping relative to the physical space, associated SR asset(s) and their location(s) within the SR layer, and the like), marker data (e.g., marker identification information and marker location information), as discussed in more detail below. While FIG. 1 shows the data store(s) 108 being a remote data store (e.g., cloud-based database) communicatively coupled to the user device(s) 102a-n and server(s) 106 via network 104, in some embodiments, the data store 108 can be a database stored in a local memory of the user device(s) 102a-n and/or in a local memory of the server(s) 106.

A managing terminal 110 can be communicatively coupled to the server(s) 106 and/or the database(s) 108 via network 104, for managing the system 100. For example, a manager (or administrator) of the system 100 can use terminal 110 to assign, modify, update, and/or confirm SR data associated with a SR environment stored in the database(s) 108.

Figure 2:
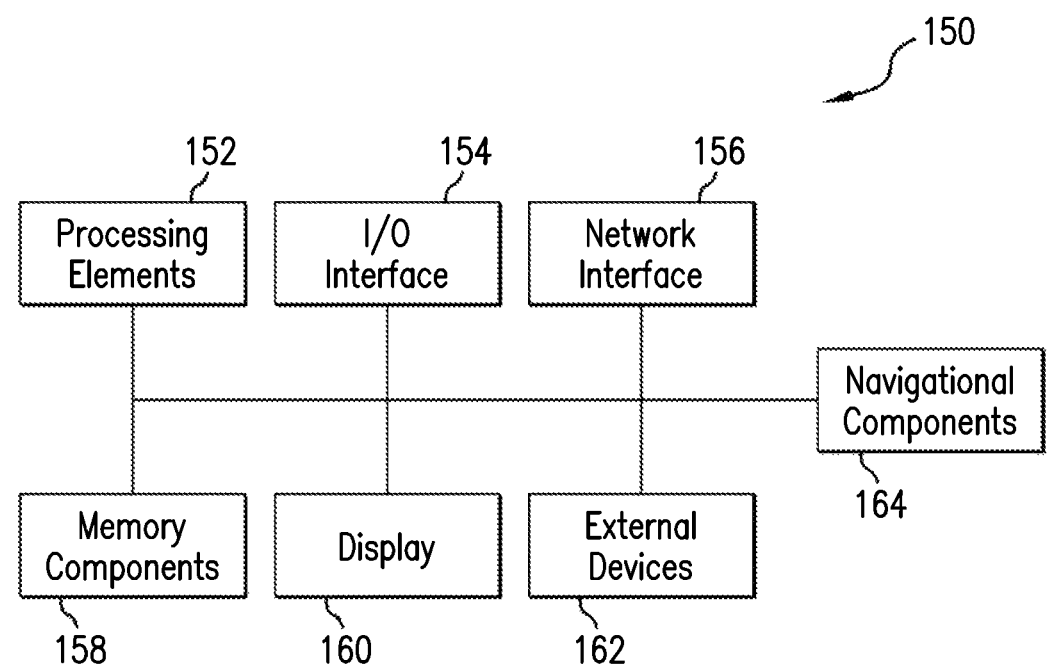
FIG. 2 is a simplified block diagram of a computing device that may be used with the system of FIG. 1.

A simplified block structure for a computing device 150 that may be used with the system 100 or integrated into one or more of the system 100 components is shown in FIG. 2. For example, the server 106, user device(s) 102a-n, managing terminal 110 and/or database(s) 108 may include one or more of the components shown in FIG. 2 and use one or more of these components to execute one or more of the operations disclosed in method 200. With reference to FIG. 2, the computing device 150 may include one or more processing elements 152, an input/output interface 154, a network interface 156, one or more memory components 158, a display 160, and one or more external devices 162. Each of the various components may be in communication with one another through one or more busses, wireless means, or the like.

The one or more processing elements 152 may be substantially any electronic device capable of processing, receiving, and/or transmitting instructions. For example, the processing element(s) 152 may be a central processing unit, microprocessor, processor, or a microcomputer. Additionally, it should be noted that the processing element(s) 152 may include more than one processing member. For example, a first processing element 152 may control a first set of components of the computing device 150 and a second processing element 152 may control a second set of components of the computing device 150, where the first and second processing elements 152 may or may not be in communication with each other, e.g., a graphics processor and a central processing unit which may be used to execute instructions in parallel and/or sequentially.

The input/output interface 154 allows the computing device 150 to receive inputs from a user and provide output to the user. For example, the input/output interface 154 may include a capacitive touch screen, keyboard, mouse, camera, stylus, or the like. The type of devices that interact via the input/output interface 154 may be varied as desired. Additionally, the input/output interface 154 may be varied based on the type of computing device 150 used. Other computing devices 150 may include similar sensors and other input/output devices 154.

The memory components 158 are used by the computer 150 to store instructions for the processing element 152, as well as store data, such as SR data, marker data, location data, and the like. The memory components 158 may be, for example, non-volatile storage, a magnetic storage medium, optical storage medium, magneto-optical storage medium, read only memory, random access memory, erasable programmable memory, flash memory, or a combination of one or more types of memory components 158.

The display 160 may be separate from or integrated with the computing device 150. For example, for cases in which the computing device 150 is a smart phone or tablet computer, the display 160 may be integrated with the computing device 150 and in instances where the computing device 150 is a server or a desktop computer the display 160 may be separate from the computing device 150. The display 160 provides a visual output for the computing device 150 and may output one or more graphical user interfaces (GUIs). The display may be a liquid display screen, plasma screen, light emitting diode screen, cathode ray tube display, and so on. The display 160 may also function as an input device in addition to displaying output from the computing device 150 to enable a user to control, manipulate, and calibrate various components of the computing device 150. For example, the display 160 may include capacitive touch sensors, infrared touch sensors, resistive grid, or the like that may capture a user's input to the display 160.

The network interface 156 receives and transmits data to and from the computing device 150. The network interface 156 may transmit and send data to the network 104, other computing devices, or the like. For example, the network interface 156 may transmit data to and from other computing devices through the network 104 which may be a wireless network (Wi-Fi, Bluetooth, cellular network, etc.) or a wired network (Ethernet), or a combination thereof. In particular, the network 104 may be substantially any type of communication pathway between two or more computing devices. For example, the network interface 156 may include components that are wireless, wired (e.g., USB cable), or a combination thereof. Some examples of the network 104 include cellular data, Wi-Fi, Ethernet, Internet, Bluetooth, closed-loop network, and so on. The type of network 104 may include combinations of networking types and may be varied as desired.

The external devices 162 are one or more devices that can be used to provide various inputs to the computing device 150, e.g., a mouse, microphone, keyboard, trackpad, sensors (e.g., temperature sensors, light sensors, etc.) or the like. The external devices 162 may be local or remote and may vary as desired. The navigational components 164 can include motion and/or position sensors such as an accelerometer, gyroscope, inertial measurement unit, or the like.

Figure 3:
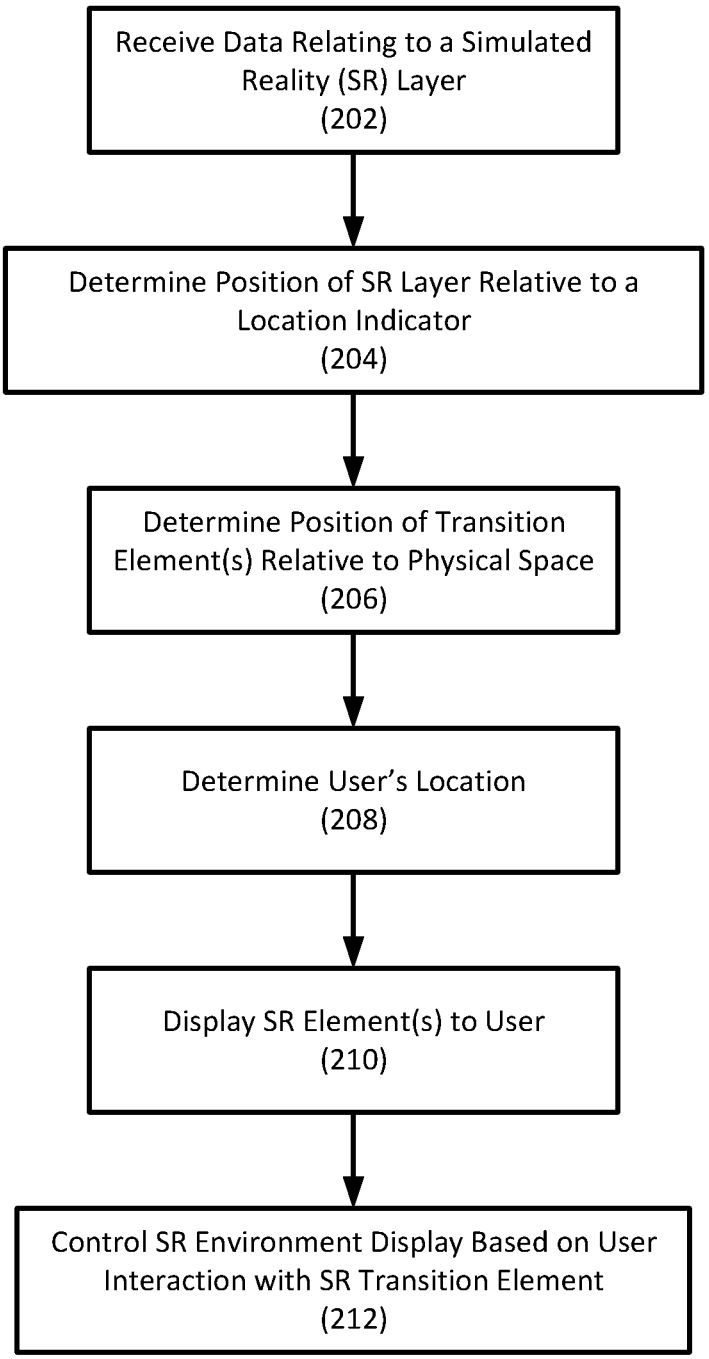
FIG. 3 is a flow chart illustrating an example method for presenting a SR environment to a user based on a user's position relative to a SR transition element, which may be performed by the system of FIG. 1.

FIG. 3 is a flowchart illustrating a method for positioning a user relative to an SR transition element and an associated SR environment. The method 200 may be carried out by the system disclosed in FIG. 1. The method 200 begins with operation 202 and data and/or information relating a simulated layer is received, determined, and/or created.

In some embodiments, SR data may be received (e.g., from a user or from an external server) and stored. SR data may include SR layer data including information such as, for example, the SR layer type (e.g., virtual reality or augmented reality), required SR layer location relative to a location indicator(s), identification of one or more location indicators, SR assets and/or features associated with the SR layer (e.g., an SR transition element, doors, walls, objects in the SR layer, etc.), and the layout of the SR layer (e.g., the position of the SR assets relative to one another).

As discussed, the SR data may also include SR transition element information. For example, the SR data may define a specific location of a SR transition element within the SR layer. An SR transition element of the present disclosure provides a means to view, access, and/or transition to an associated SR environment(s). In some embodiments, the SR transition element provides a window to view the SR environment. For example, the SR environment may be displayed to the user by a user looking through the SR transition element in the form of a window. In some embodiments, the SR transition element provides an entryway to access the SR environment. For example, when the user passes through the SR transition element, the user may view more of the SR environment that is displayed through the SR transition element. In some embodiments, the SR environment is only displayed when the user passes through the SR transition element. In some embodiments, after a user has passed through the SR transition element into the SR environment, the user may view the SR transition element from the SR side of the SR transition element and view the real world environment through the SR transition element. In these embodiments, the user may walk back through the SR transition element and enter back into the real world environment (as viewed on the screen of the user device).

In some embodiments, the SR transition element may be associated with an SR asset, such as for example, a portal, frame, shape, image, or the like; and a user may interact (e.g., touch) with the SR asset to view, access, and/or transition to an associated SR environment. In some embodiments, the SR transition element may be an invisible doorway to the SR environment, such that the SR environment is only displayed once a user passes through the invisible SR transition element.

SR transition elements may have one or more unique associated SR environments that a user can view, access, and/or transition to using the SR transition element (e.g., that is viewable upon user movement relative to the SR transition element—e.g., a user passing through the SR transition element). For example, the SR environment may be a virtual reality environment or an augmented reality environment. The SR assets around different sides of a SR transition element may vary, creating a unique SR environment(s). For example, in some embodiments, a first environment is displayed external to the SR transition element and a second environment is displayed internal to the SR transition element, and, as a user passes through the SR transition element location, the first environment is displayed internal to the SR transition element and the second environment is displayed external to the SR transition element giving the user an impression that passing through the SR transition element changed the SR environment. In some embodiments where the SR transition element provides a transition to an augmented reality environment, prior to passing through the SR transition element location, a user may view a real world environment with no AR assets, and upon passing through the SR transition element location, the user may view one or more AR assets overlaid over the real world environment. As one example, an SR transition element may be used as part of an advertising campaign and may be associated with an augmented reality environment including augmented reality advertisements for products.

In some embodiments, multiple SR transition elements may be provided in the SR layer. For example, SR transition elements may be positioned at different locations relative to one another and/or relative to the location indicator, each providing a different access point to the same or different SR environments. In this example, each SR transition element may have a unique position relative to the SR layer.

SR transition element data included with the SR data may include SR transition elements identifying information, information relating to the position of the SR transition element(s) on the SR layer, orientation information (e.g., including directional information of the SR transition element), dimensional information (e.g., size of the SR transition element), and the like. Such data may be used to display the SR transition element to a user upon positioning of the SR layer relative to the user's location.

The SR transition element identifying information may include a unique identifier (e.g., a label for the SR transition element), type data (e.g., shape, visibility, etc.), and the like.

The SR transition element type data may indicate the appearance of the SR transition element. For example, an SR transition element may have any of various shapes, such as, for example, a frame, rectangle, diamond, triangle, circle, etc. In some embodiments, the SR transition element may be a portal, an image (e.g., a picture of a sunset), an object (e.g., a door, an animated character, etc.), or the like. The SR transition element may be two-dimensional or three-dimensional. In some embodiments, the SR transition element is single-sided and only has one side that provides access to the SR environment. In alternate embodiments, the SR transition element is multi-sided and has multiple sides that provide access to one or more SR environments. In some embodiments, the SR transition element may be invisible to a user and may act as a place marker in physical space to access a SR environment.

Figure 6:
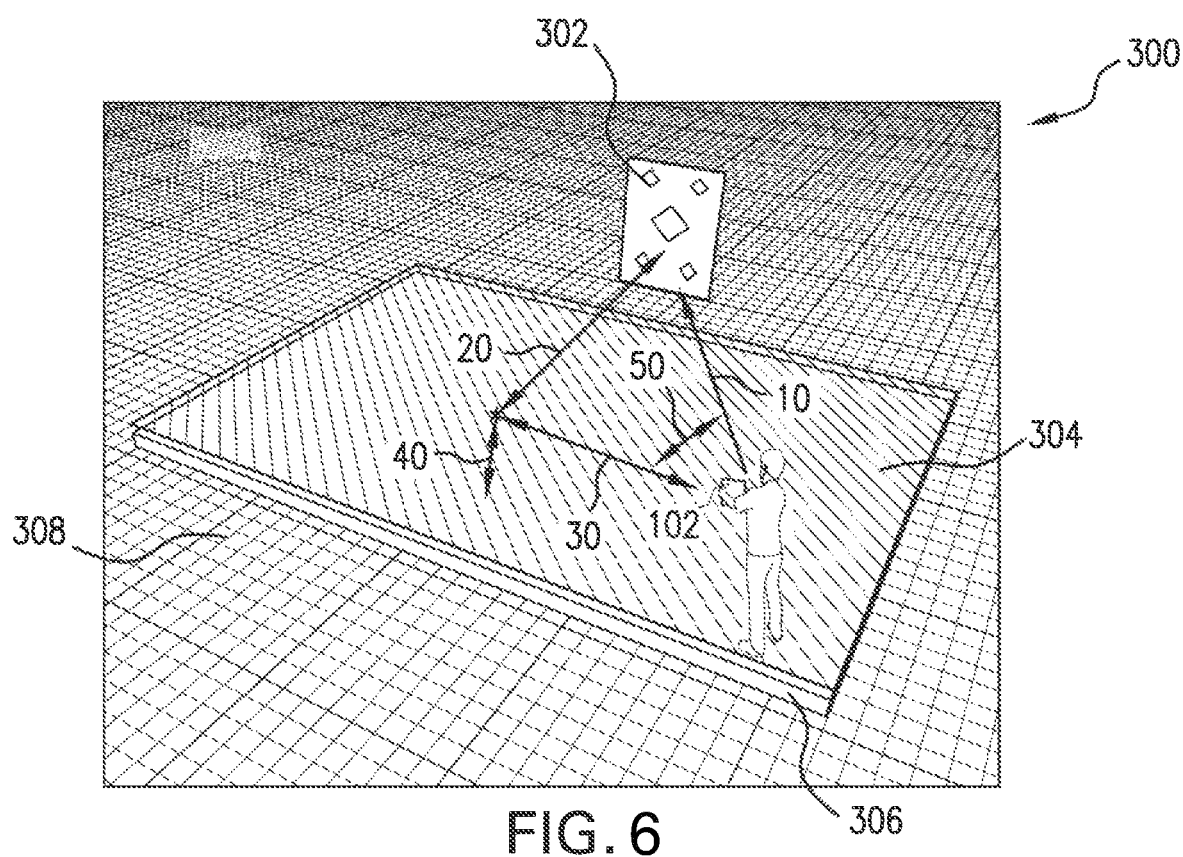
FIG. 6 is schematic representation of an example SR layout positioned relative to a physical space with a single marker.
Figure 7:
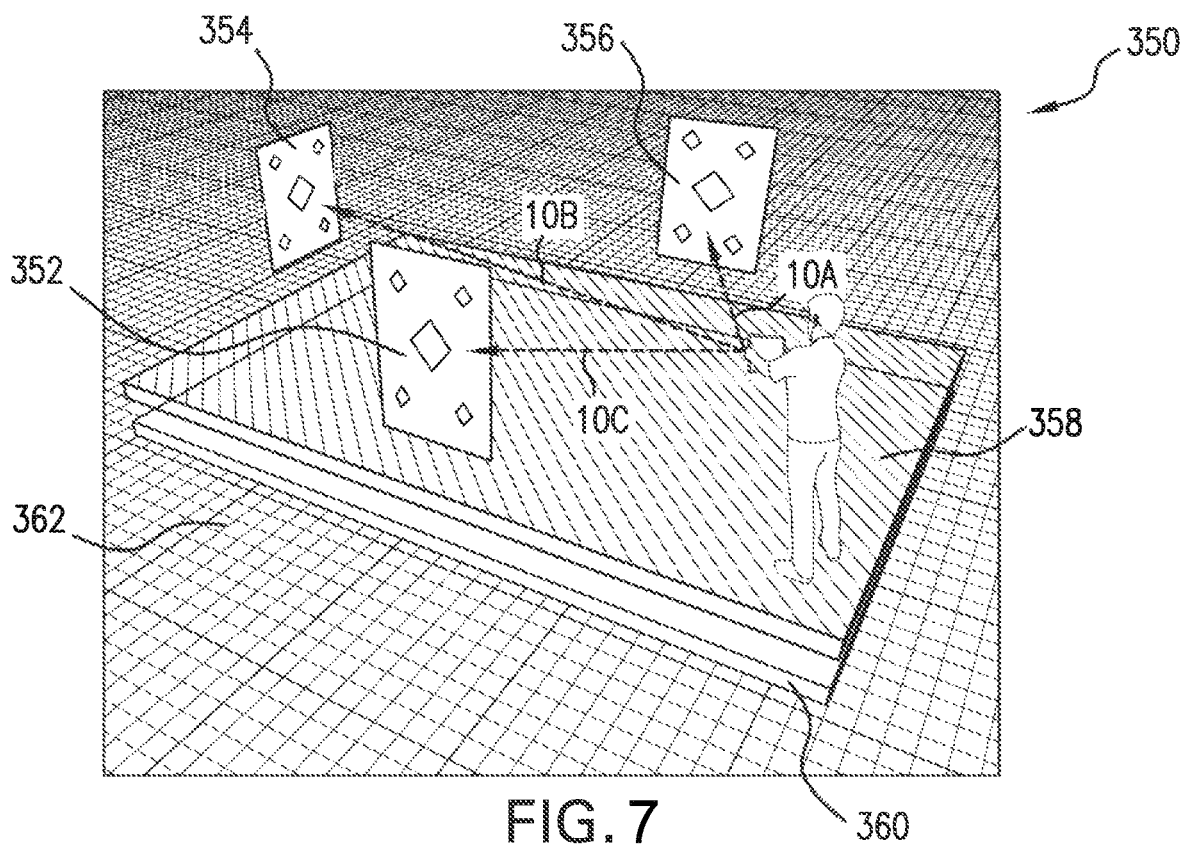
FIG. 7 is a schematic representation of an example SR layout positioned relative to a physical space with a plurality of markers.

The SR transition element may have a preset location relative to an associated SR layer. In these embodiments, information relating to the position of the SR transition element(s) on the SR layer includes information on the specific location of the SR transition element relative to the SR layer. For example, where the SR layer is positioned relative to a location indicator, the preset location of the SR transition element relative to the SR layer can be used to determine the location SR transition element relative to the location indicator. As another example, where the SR layer layout is defined by a coordinate system (e.g., as shown in FIGS. 6 and 7), the information relating to the position of the SR transition element(s) may include coordinates within the coordinate system that correspond to a location of the SR transition element relative to the SR layout. In another example, the SR layer layout may have distinct points or features within the layout. For example, distinct points or features may indicate a wall, floor, ceiling, corner, and the like. In this example, the information relating to the position of the SR transition element(s) may indicate a position of the corresponding SR transition element relative to one or more distinct points or features within the SR layout. For example, the information relating to the position of the SR transition element(s) may indicate that an SR transition element is positioned centrally in the SR layer, equal distance from four simulated walls and a simulated floor and ceiling. This data may include dimensions (e.g., SR transition element is positioned 6" above the floor, 6" below the ceiling, and 6" from either wall).

While the current disclosure describes positioning of a SR transition element using a SR layer, optionally the location of the SR transition element may also be determined relative to a specific identifiable physical structure (e.g., a store, hallway, doorframe, window, walkway, etc.) in a physical space (e.g., with or without an intervening SR layer). The identifiable structure may be detectable by a camera. The identifiable object may be a 3D shape (e.g., square, triangle, diamond, polygon, hexagon, etc.), a commonly used object (e.g., a doorframe, door handle, picture frame, light switch, faucet, etc.), an object previously detected by the system (and with object information stored in a database), or the like. The identifiable structure may be fixed (e.g., non-movable, permanent, etc.) or repositionable (e.g., movable, temporary, etc.). For example, the identifiable object may be a doorframe that has a fixed location in the physical space. In the example where the identifiable object is repositionable, the identifiable object may be moved to various discrete locations throughout the surrounding physical environment. As discussed in more detail below, an identifiable object may act as an anchor to an SR transition element (e.g., by having a position relative to the SR transition element).

In some embodiments, a fixed identifiable object may be desirable to maintain a constant anchor for an SR transition element to fix the SR transition element in the physical space.

The directional information of the SR transition element may include the direction or the orientation of the SR transition element relative to the location indicator and/or within the SR layer (e.g., relative to other SR assets within the SR layer) (e.g., up/down from, right/left of, in front of or behind, facing towards/away from, etc., the location indicator and/or other SR asset). In some embodiments where the SR transition element has a position relative to an identifiable physical structure (e.g., a doorframe or a table), the SR transition element may have a direction relative to the structure (e.g., in front of or behind, right/left of, etc., the physical structure). In embodiments where the SR transition element is single-sided, the SR transition element may be positioned such that the side of the SR transition element providing access to the SR environment is facing towards or away from the location indicator, other SR asset, or identifiable physical structure.

The orientation information of the SR transition element may also include information on the perspective/orientation (e.g., angle and distance) of the SR transition element relative to the location indicator, to assets in the SR layer, and/or to the identifiable structure. For example, the SR transition element may be positioned directly in front of an SR layer asset, the location indicator, and/or the identifiable structure such that the offset angle is zero degrees. On the other hand, the SR transition element may be positioned at an offset angle from the SR layer asset, the location indicator, and/or the identifiable structure. The SR transition element may also be rotated relative to the SR layer asset, the location indicator, and/or the identifiable structure (e.g., an orientation angle). For example, where the location indicator or the identifiable structure is a doorframe and the SR transition element is a virtual frame, the SR transition element may be angled parallel to the doorframe or perpendicular to the doorframe (or at any other angle relative to the doorframe). In the example where the SR transition element is angled parallel to the doorframe, a user may enter the SR transition element in the same manner as the user would enter the doorframe. In the example where the SR transition element is angled perpendicular to the doorframe, the user may walk in a direction parallel to the doorframe to enter the SR transition element. The SR transition element may also be set a particular distance away from a SR asset, location indicator, and/or the identifiable structure. In some examples, the SR transition element may be in the same position as a SR asset, location indicator, and/or the identifiable structure (e.g., may overlay or align with the SR asset and/or identifiable structure). For example, in the example where the identifiable structure is a doorframe and the SR transition element is a frame, the SR transition element may be placed inside the doorframe such that a user may walk through the doorframe and the SR transition element simultaneously.

The dimensional information of the SR transition element may include the dimensions of the SR transition element relative to the SR layer, distance to a user, and/or identifiable structure. For example, the SR transition element may have a size determined by the distance to a user. For example, the closer a user is, the larger the SR transition element. As another example, when the SR layer is scaled to a different size or the identifiable structure is resized in the captured image (e.g., by the user moving closer or further away from the identifiable structure), the size of the SR transition element is respectively scaled.

The SR data including the SR transition element data may be input by an administrator such as a creator of an SR environment. In several embodiments, the SR data and/or the SR transition element data may only be altered by the administrator.

Referring back to FIG. 3, at 204, the position of the SR layer relative to a location indicator in a physical space is determined. In some embodiments, the position of a SR layer relative to a location indicator may be calculated by the system based on, without limitation, information included in the SR data corresponding to relative positioning of the SR layer and one or more location indicators. For example, if the location indicator is a product display in a physical space, the system may determine the position of the SR layer relative to the product display using SR data that includes relative positioning of the SR layer and product displays of different types.

As discussed above, a location indicator may be a component configured to provide a reference for positioning of a SR layer (i.e., various assets included in the SR layer) relative to a real world environment. Examples of location indicators may include without limitation, physical objects/features in a real world environment (e.g., walls, windows, doors, trees, objects, locations, etc.), location feedback providing objects in a real world environment (e.g., markers, beacons, etc.), a mapping of a physical space in the real world environment (e.g., a coordinate system or a grid), etc., or combinations thereof. The position of the SR layer relative to the location indicator may be determined to, for example, a define spatial relationship (e.g., distance, coordinates, etc.) between a location indicator and one or more assets of a SR layer, a mapping between a layout of a physical space and a layout of a SR layer, or the like. In these embodiments, the SR layer may define a location of a various SR assets (e.g., an SR transition element), such that the SR assets have a position relative to the location indicator (e.g., based on the position of the SR layer relative to the location indicator).

In some embodiments, a location indicator may be any physical component configured to provide location feedback. In such examples, the location indicator can be a localized indicator and/or a wide area indicator. For example, as discussed in more detail below, a localized location indicator may be one or more markers, beacon devices, and the like. These devices utilize line of sight or short range signals interacting with the user within the immediate area of the indicator. In some examples, the location indicator can be a wide area indicator. Wide area indicators can include devices such as WiFi routers, satellites, radios, and the like. These devices utilize the ability to communicate with the user from a distance. The user and the wide area indicator do not need to be in the same immediate area. In these embodiments, the SR layer may define a location of a various SR assets (e.g., an SR transition element), such that the SR assets have a position relative the location feedback provider.

In some embodiments, the location indicator may be a coordinate system, a grid, a layout of a physical environment, etc. that has a defined relationship to a real world environment. In such embodiments, positions of various assets that form the SR layer and/or the SR layer itself may be determined based on the coordinate system or grid. In such embodiments, the SR environment is mapped to a physical space. For example, a SR layer may be overlaid relative to the physical space by a coordinate system or grid.

As another example, a SR layer may be mapped to real world features or objects. In some embodiments, such real world features or objects may have corresponding features or objects in the simulated environment. For example, a SR floor plan including SR features (e.g., simulated walls, aisles, etc.) may be overlaid on a physical space having physical or real world features (e.g., walls, aisles, etc.) that correspond to the SR features or assets in a defined spatial relationship. In an additional example, a physical marker may be placed at a particular location within the physical environment. A corresponding virtual marker or virtual representation of the physical marker may be placed at a specific location within the SR environment, and may serve as a location indicator.

In these examples, the SR layer may also define the location of an SR transition element, such that the SR transition element has a position relative to the physical space (e.g., based on the position of the SR layer relative to the physical space). As one example, the SR transition element may be mapped to a specific defined location in the physical space or the real world environment, via the SR layer.

In one or more embodiments, at 206 the system may use the determined relationship between the location indicator in a physical space and the SR layer to determine positions of one or more transition elements relative to the physical space or real world environment. The physical space or real world environment may be an indoor environment (e.g., an office, store, hallway, mall, hospital, classroom, etc.) or an outdoor environment (e.g., street, patio, market, fair grounds, etc.). As discussed above, a location indicator has a defined relationship with and/or location within a real world environment. Therefore, the system may use the determined position of the SR layer relative to the location indicator to position the SR layer in the real world environment. This allows the simulated layer that defines the location of assets (including transition elements) in the simulated world to be located according to the location indicator which is also correlated with the real world location. This also allows the assets to be located with a fixed location. Therefore, a transition element can be fixed allowing different perspectives of the transition element based on the different locations of the user.

In several embodiments, two or more SR environments may be positioned relative to the location indicator. As one example, a first SR environment may be positioned relative to the location indicator and a second SR environment may be positioned relative to the first SR environment. As one example, the first SR environment is an augmented reality environment that includes an SR transition element as an augmented reality asset. In this example, the second SR environment (e.g., an augmented reality environment or a virtual reality environment) is positioned relative to the SR transition element which can function as a portal between the two SR environments. In other words, the SR transition element functions as a portal to transition a user from a first SR layer that defines the first SR environment and a second SR layer that defined the second SR environment (the SR transition element is located at a physical location that is shared by both SR layers). In various embodiments, the simulated environment is situated by using the known position of location indicators (e.g. markers 254 in FIG. 4). The location indicators can be correlated with a real world location.

In some embodiments, the location indicator may be a layout of a physical environment. As one example, the physical environment may have a physical floorplan and the SR environment may have a corresponding simulated floorplan that maps to the physical floorplan. For example, the position of physical features (e.g., physical walls, floors, isles, trees, buildings, etc.) within a physical floorplan may have corresponding simulated assets (e.g. simulated walls, floors, isles, buildings, etc.) within the simulated floorplan. In another example, the physical environment may have certain dimensions that can be mapped to a coordinate system (e.g., XYZ coordinates). The SR environment may have a corresponding coordinate system that maps the SR environment to the physical environment. In an additional example, a physical marker may be placed at a particular location within the physical environment. A corresponding virtual marker or virtual representation of the physical marker may be placed at a specific location within the SR environment. The virtual marker may be aligned with the physical marker to position the SR environment relative to the physical environment. In some examples, the SR layout may have the same dimensions as the physical space. For example, the SR layout can be scaled, rotated, and the like in order to fit the physical space. In other examples, the SR layout may be smaller or larger than the physical space.

In some embodiments, the specific location of the SR transition element in physical space may be directly or indirectly determined. For example, in embodiments where the SR transition element is positioned relative to a location indicator, and the location indicator has a defined location in the physical space, the position of the SR transition element in physical space is indirectly determined. In these embodiments, because the position of the location indicator relative to the physical space is known, and the position of the SR transition element relative to the location indicator is known, the system can apply a mathematical algorithm to determine the position of the SR transition element relative to the physical space. As another example, in embodiments where the SR transition element is positioned relative to an identifiable physical structure, the SR transition element position in physical space is directly determined.

With continued reference to FIG. 3, the method 200 proceeds to operation 208 and a user's location is determined relative a SR transition element to be displayed to the user immersed in a SR experience. In some embodiments, the disclosed system receives location information from a user device. For example, the user device may include navigational components (e.g., a global positioning system (GPS)) that track a user's position in physical space. Since the location of the transition elements (via the SR layer) is known relative to the real world environment, the location information from the user device can be used to determine the location of the user relative to the transition element(s).

In some embodiments, the system uses one or more location indicators to position the user relative to the one or more location indicators, and, in some embodiments, relative to the physical space. For example, a user location indicator may be a physical component the provides location information. For example, a location indicator may be a marker, as discussed in more detail below, a Wi Fi router, a satellite, a Bluetooth device, a radio, or the like. For example, a location indicator may be a signal transmitter and/or receiver configured to use signals to locate an object. In some embodiments, the system may use triangulation with two or more location indicators to determine a user's position. In some embodiments, the disclosed system uses image recognition to determine the user's position in physical space. For example, the system may use markers to determine the user's position. As one example, the system may use the marker-based positioning system disclosed in U.S. application Ser. No. 16/856,916 and Provisional U.S. Application No. 62/837,559. Since the location of the transition elements (via the SR layer) is known relative to location indicators, the location of the user relative to the location indicators(s) can be used to determine the location of the user relative to the transition element(s). The user's position relative to the SR transition element may be determined based on the position of the SR layer relative to the location indicator and the position of the user relative to the location indicator. For example, using triangulation, the user's position relative to the SR layer (and thus the SR transition element defined by the SR layer) can be determined. For example, the system may calculate the distance and/or angle between the user and the SR transition element based on known mathematical calculations (e.g., the Law of Sines, the Law of Cosines, the Pythagorean Theorem, etc.).

FIGS. 6 and 7, for example, show SR systems 300 and 350 with a user's location determined via one or more markers. For example, FIG. 6 shows a SR system 300 with a single physical marker 302. In this example, a SR layer 304 is overlaid relative to the physical space 306 by a coordinate system or grid 308. The physical marker 302 has a defined position relative to both physical space 306 and the SR layer 304 based on the coordinate system or grid 308. The position of the user device 102 can be determined via inspection of the marker 302 along viewing direction 10. Based on the angle, size, and overall appearance of the marker 302 the location of the device 102 is determinable. For example, the height 40, lateral distance 20, and transverse distance 30 can be determined relative to the marker. Additionally, the angle of the viewing direction 50 relative to the transverse direction can also be determined. In various embodiments the roll, pitch, and yaw, of the device 102 can be determined by inspection of the marker 302 in addition to or instead of use of the internal sensors of the device 102. This information allows the system to locate the user device 102 within the physical and/or simulated space.

As another example, FIG. 7 shows a SR system 350 with a plurality of physical markers 352, 354, 356. A SR layer 358 is positioned relative to the physical space 360 by a coordinate system or grid 362. In this example, each marker 352, 354, 356 may have a known position relative to both the physical space 360 and the SR layer 358 based on the coordinate system or grid 362. However, it is also contemplated that one marker 352 has a known position relative to the SR layer 358, while the other markers 354, 356 have known positions relative to the physical space 360 relative to the first marker 352, as discussed in more detail in Provisional U.S. Application No. 62/837,559. In this example, the markers' 354, 356 positions relative to the SR layer 358 can be determined through triangulation with the first maker 352. Additionally, the device position 102 can be determined based on inspection of the markers 352, 354, and 356 along viewing directions 10C, 10B, and 10A respectively.

With continued reference to FIG. 3, after operation 208, the method 200 proceeds to operation 210 and the SR transition element is displayed to the user. The SR transition element is displayed to the user based on the determined position of the SR transition element (preset within the SR layer) relative to the user. Once a user's position relative to the SR transition element is known, the system can retrieve the SR transition element for proper display. For example, the system can determine the appropriate perspective view, dimensions, etc. of the SR transition element using, for example, the precise positioning of the camera of the user's device, the SR transition element data, or the like. The system determines, for example, the angle, size, and foreshortening aspects of the SR transition element to display to the user based on the user's position relative to the SR transition element. For example, the size of the SR transition element may appear larger if the user is closer to the SR transition element than if the user is positioned further away from the SR transition element. In this manner, the SR transition element may be displayed according to the precise positioning of the camera of the user's device relative to the SR layer.

After operation 210, the method 200 may proceed to operation 212 to transition and/or otherwise control a SR environment display based on user interaction (e.g., movement) relative to the SR layer and/or the SR transition element. For example, as the user moves through the SR transition element, a display on the user device may change. For example, prior to moving through the SR transition element, the display may show a first environment including a first set of SR assets. In this example, after moving through the SR transition element, the display may show a second environment including a second set of SR assets. Specifically, upon passing through the transition element, a user transitions from experiencing a first SR environment to experiencing a second SR environment. For example, the user may experience walking from a first environment outside a door (i.e., the Sr transition element) to a second environment inside a door. The first and second environments may be a real world environment, a virtual reality environment, or an augmented reality environment. In some examples, the display may show a first environment external to the SR transition element and a second environment internal to the SR transition element. Upon a user moving through the SR transition element, the display may show the first environment internal to the SR transition element and the second environment external to the SR transition element.

As an illustrative example, a display may depict a first virtual reality environment of a log cabin living room external to a front door that is the SR transition element, and displayed based on a user's location. A second virtual reality environment of a forest may be depicted internal to the front door. The user may walk towards the front door, which, in this example, correlates to a physical door. When the user opens the physical door and steps through the physical doorway, the user may enter the forest, which is shown on the display of the user device. If the user turns around, the user can view the front door of the log cabin through the display on the user device. In this case, the forest is now external to the front door and the log cabin living room is internal to the front door. Because the user has been previously positioned relative to the virtual reality environment, the user's positioning in the physical environment corresponds to positioning in the virtual reality environment. Virtual assets (e.g., the log cabin, door, trees, etc.) are mapped within the virtual reality environment, such that the user's positioning relative to the virtual assets can be determined based on the user's positioning relative to the virtual reality environment. In this example, the user's positioning relative to the log cabin door is determinable.

Once a user's position is calibrated relative to the SR environment, a user may move around the physical environment and reposition his or her self relative to the SR environment and the transition element(s) displayed, if this is to be visible. For example, a user device of the present system may include internal navigation technology (e.g., a global positioning system). As the user moves around the physical space, the internal navigation technology repositions the user relative to the SR environment. As another example, the user's position relative to the one or more location indicators may be recalculated as the user moves around. As another example, a roaming user may be repositioned relative to the SR environment using simultaneous localization and mapping (SLAM). As yet another example, a roaming user may be repositioned relative to the SR environment using sensor-fusion. This change in positioning of the user may be used to control the SR environment display, as discussed above without computationally and/or data expensive methods of traditional systems that use, for example, computer vision.

Figure 4:
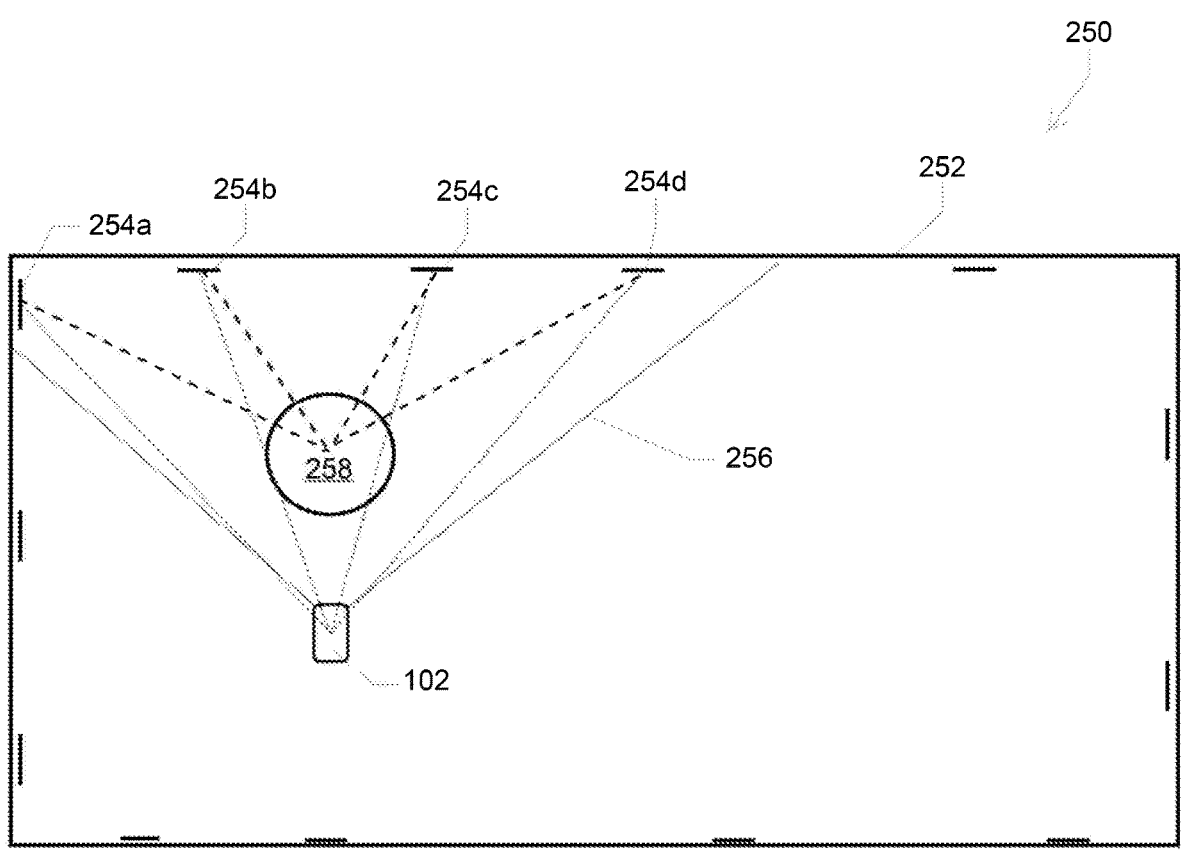
FIG. 4 is a schematic representation of an example SR system that uses markers to position a user relative to a SR transition element.
Figure 5:
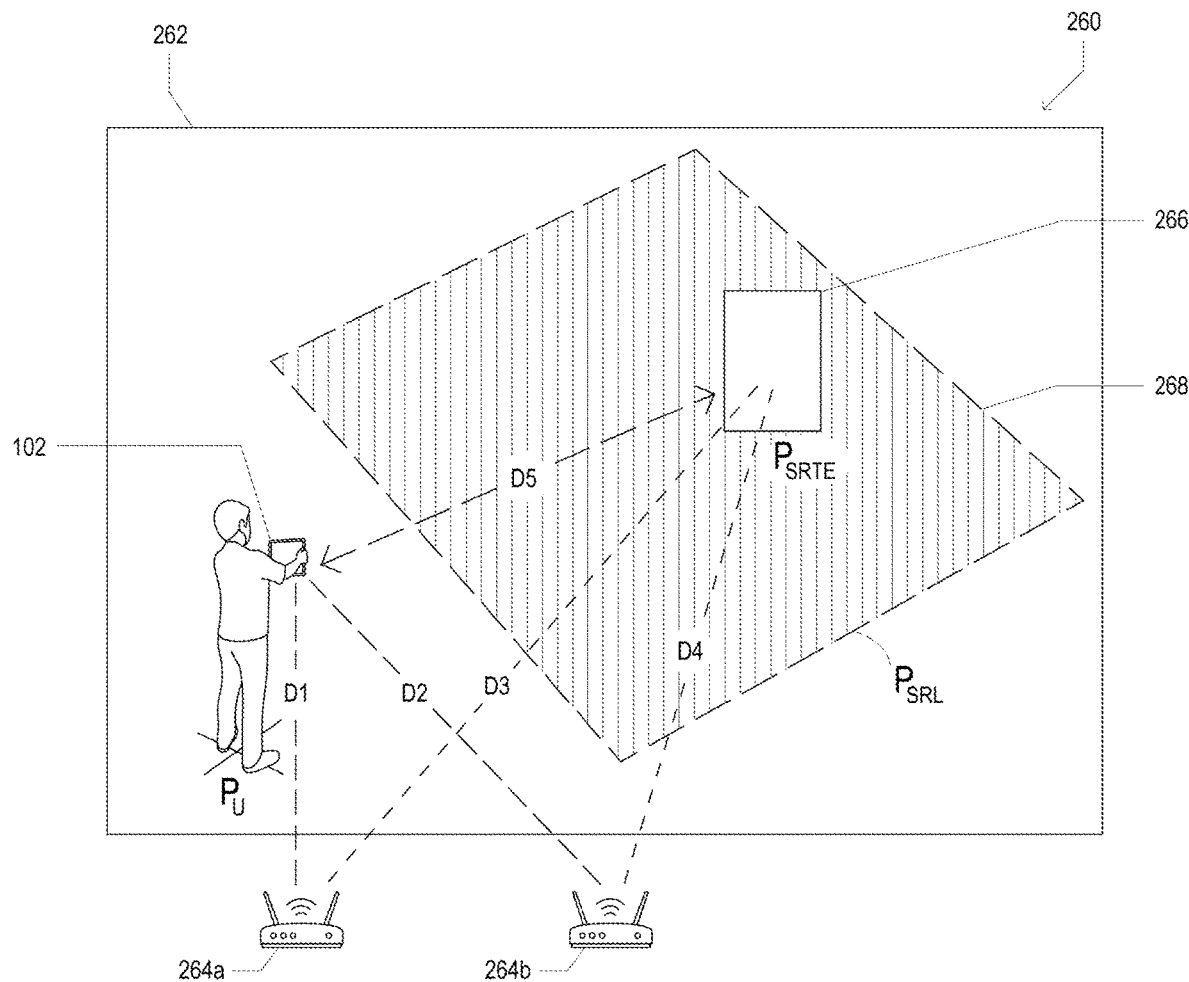
FIG. 5 is a schematic representation of an example SR system that uses WiFi equipment to position a user relative to a SR transition element.

FIGS. 4 and 5 show schematic representations of SR systems 250 and 260 that can be used according to disclosed systems and methods. FIG. 4 shows a SR system 250 that uses markers to position a user relative to an SR transition element. For example, a user device 102 may be positioned in physical space 252. The user device 102 may have a field of view 256 that captures a plurality of markers 254a-d that have defined positioned in the physical space 252 and are recognizable by the user device 102. Based on image processing of the marker 254a-d images captured by the user device 102, the position of the user relative to the markers 254a-d is determined. Because the markers have a known position in the physical space 252, the user's position relative to the physical space 252 can also be determined. A SR transition element 258 (e.g., a portal) may have a defined position relative to the markers 254a-d. Based on the determined location of the user device 102 relative to the markers 254a-d and the defined position of the SR transition element 258 relative to the markers 254a-d, the position of the user device 102 relative to the SR transition element 258 can be determined by mathematical calculations (e.g., the Law of Sines, the Law of Cosines, the Pythagorean Theorem, etc.).

FIG. 5 shows a SR system 260 that uses WiFi equipment (e.g., routers) to position a user relative to an SR transition element. For example, a user device 102 may be positioned in physical space 262. The user device 102 may be in communication with two WiFi routers 264a,b. The routers 264a,b may be positioned in the same physical space 262, or, as depicted, outside the physical space 262. The user device 102 is positioned a distance D1 from one router 264a and a distance D2 from the other router 264b. The distances D1 and D2 may be determined, for example, based upon the signal strength from each router 264a,b. The position of the user $P_u$ relative to the routers 264a,b may therefore be determined based on signal strength. The SR transition element 266 may also have a defined position $P_{SRTE}$ relative to the routers 264a,b. For example, the SR transition element 266 may be positioned a distance D3 from the router 264a and a distance D4 from the router 264b. This positional information may be input into the system (e.g., by an administrator), for example, as SR transition element data, as discussed in more detail above. Based upon the position of the user $P_u$ relative to the routers 264a,b and the position of the SR transition element $P_{SRTE}$ relative to the routers 264a,b, the position of the user device 102 relative to the SR transition element 266 may be determined. For example, D5, the distance between the user device 102 and the SR transition element 266 is determinable based on the known distances D1, D2, D3, and D4. While the example discussed uses the position of the SR transition element 266 relative to the routers 264a,b, it is also contemplated that the system 260 may include an SR layer 268 that has a defined location in the physical space $P_{SRL}$. In this example, the SR transition element 266 may have a defined position in the SR layer 268 (and therefore relative to the physical space 262). The position of the user device 102 in the physical space 262 may be indirectly determined based on the user device 102 position relative to the routers 264a,b. In this example, the position of the SR transition element 266 relative to the user device 102 may be determined based on the position of the user device 102 in physical space 262 and the position of the SR transition element 266 in physical space 262.

Figure 8:
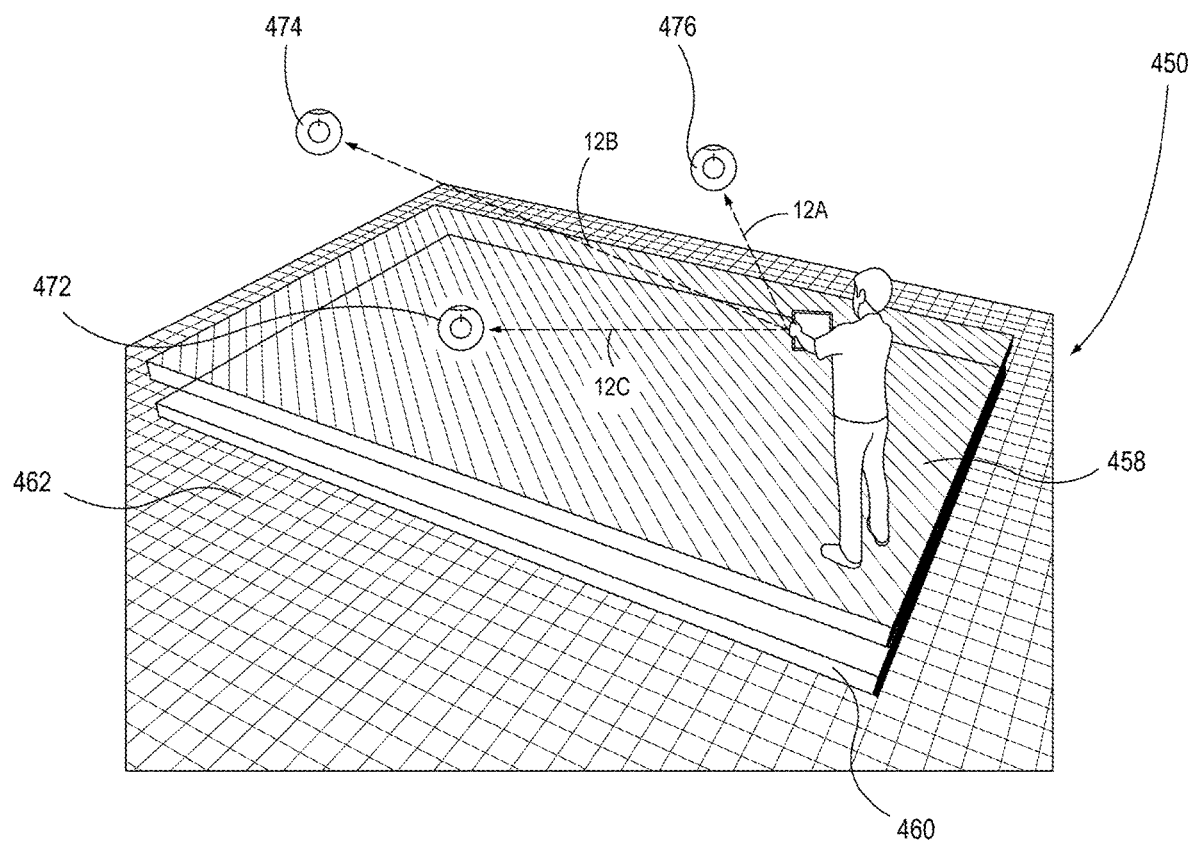
FIG. 8 is a schematic representation of an example SR layout positioned relative to a physical space with a plurality of beacons.

As another embodiment, FIG. 8 shows a SR system 450 with a plurality of localized location indicators. Here the localized location indicators are beacons 472, 474, 476. In this example, the SR layer 458 can positioned relative to some aspect of the real world. This aspect could be the position of the user. In another example, this aspect could be the geographic layout of the physical space 460. The geographic layout could follow a coordinate system or grid 462 that aligns with or represents physical space locations. In this example, each beacon 472, 474, 476 may have a known position relative to an aspect of the real world (e.g. user or physical space 460) and the SR layer 458. However, it is also contemplated that one beacon 472 has a known position relative to the SR layer 458, while the other beacons 474, 476 have known positions relative to the physical space 460 relative to the first beacon 472. In this example, the beacons' 474, 476 positions relative to the SR layer 458 can be determined through triangulation with the first beacon 472. Additionally, the device position 102 can be determined based on inspection of the beacons 472, 474, and 476 along viewing directions 12C, 12B, and 12A respectively. In various embodiments, each beacon can have self-contained information that can be shared across short range communication such as Bluetooth. For example, the beacons are not connected to the internet. In other embodiments, the beacons are connected to the internet.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, and mobile electronic devices such as smartphones, personal digital assistants, cameras, tablet computers, laptop computers, media players and the like. In a client-server arrangement, the client device and the server are each electronic devices, in which the server contains instructions and/or data that the client device accesses via one or more communications links in one or more communications networks. In a virtual machine arrangement, a server may be an electronic device, and each virtual machine or container may also be considered to be an electronic device. A client device, server device, virtual machine or container may be referred to simply as a "device" for brevity.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The technology described herein may be implemented as logical operations and/or modules in one or more systems. The logical operations may be implemented as a sequence of processor implemented steps directed by software programs executing in one or more computer systems and as interconnected machine or circuit modules within one or more computer systems, or as a combination of both. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

Any and all references specifically identified in the specification of the present application are expressly incorporated herein in their entirety by reference thereto. The term "about," as used herein, should generally be understood to refer to both the corresponding number and a range of numbers. Moreover, all numerical ranges herein should be understood to include each whole integer within the range.

The above specification, examples and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A system for presenting simulated reality (SR) relative to a position of a user, comprising:
   a camera;
   a non-transitory memory containing computer readable instructions; and
   a processor configured to process the computer readable instructions to carry out the following steps:
      determine a position of a SR layer relative to a location indicator, wherein the SR layer defines a position of a SR transition element that allows the user to transition between a first environment and a second environment, wherein the first environment is displayed comprising a real world environment with no assets being displayed and the second environment is displayed as an SR environment with one or more assets being displayed;
      receive a location input that locates the user relative to the location indicator;
      use the location input to display the SR transition element at the position of the SR transition element defined by the SR layer;
      determine a user interaction with the SR transition element; and
      based on the user interaction, display to the user the first environment, the second environment, or a combination thereof;
      wherein the position of the SR transition element in the SR layer, as experienced by the user, remains fixed when the user moves with respect to the SR transition element or through the SR transition element by changing positions in the SR layer.

2. The system of claim 1, wherein the user interaction is the user looking though the SR transition element such that the user can see the second environment while being positioned in the first environment.

3. The system of claim 2, wherein more assets are displayed in the second environment on one side of the SR transition element compared to the first environment on an opposing side of the SR transition element.

4. The system of claim 1, wherein the second environment is displayed to include an asset overlaid over another real world environment.

5. The system of claim 4, wherein the second environment is displayed such that the other real world environment is at least partially visible.

6. The system of claim 4, wherein the asset overlaid over the other real world environment is a media asset.

7. The system of claim 1, wherein displaying the SR transition element comprises displaying the first environment external to the SR transition element and the second environment internal to the SR transition element, wherein based on the user interaction, displaying to the user the first environment, the second environment, or the combination thereof comprises displaying the first environment internal to the SR transition element and the second environment external to the SR transition element giving the user an impression that passing through the SR transition element has transitioned environments.

8. The system of claim 1, wherein using the location input to display the SR transition element at the position of the SR transition element defined by the SR layer comprises determining a relative location of the user with respect to the position of the SR transition element, and using the relative location to determine one or more properties of the SR transition element for display, the one or more properties comprising at least a size or an orientation of the SR transition element.

9. The system of claim 1, wherein the SR layer further defines positions of a plurality of assets in the SR environment.

10. The system of claim 1, wherein the location indicator is a real world feature and the position of the SR layer relative to the real world feature is used to determine a location of the SR transition element with respect to the real world feature.

11. The system of claim 1, wherein the position of the SR layer relative to the location indicator is determined by receiving SR layer data from the user.

12. The system of claim 1, wherein the location input is based on the position of the user relative to a localized location indicator, wherein the localized location indicator has predetermined positions in a real world environment and relative to the SR layer.

13. The system of claim 1, wherein the location input is based on the position of the user relative to one or more wide range location indicators.

14. The system of claim 1, wherein the location input is global positioning system data received from a user device.

15. The system of claim 1, wherein the user interaction is the user passing through the SR transition element.

16. The system of claim 1, wherein the real world environment is provided based on an image captured by a camera.

17. A method for presenting simulated reality (SR) relative to a position of a user, the method comprising, by a processor:
    determining a position of a SR layer relative to a location indicator in a physical space, wherein the SR layer defines a position of a SR transition element that allows the user to transition between a first environment and a second environment, wherein the first environment is displayed comprising a real world environment with no assets being displayed and the second environment is displayed as an SR environment with one or more assets being displayed;
    receiving a location input that locates the user relative to the location indicator in the physical space;
    using the location input to display the SR transition element at the position of the SR transition element defined by the SR layer;
    determining a user interaction with the SR transition element; and
    based on the user interaction, displaying to the user the first environment, the second environment, or a combination thereof,
    wherein the position of the SR transition element in the SR layer, as experienced by the user, remains fixed when the user to moves with respect to the SR transition element or through the SR transition element by changing positions in the SR layer.

18. The method of claim 17, wherein determining the position of the SR layer relative to the location indicator comprises:
    receiving SR layer data from the user; and
    using the SR layer data for determining the position of the SR layer relative to the location indicator.

19. The method of claim 18, further comprising:
    determining, based on the position of the SR layer relative to the location indicator, positions of a plurality of SR assets relative to the location indicator;
    determining, based on the position of the SR layer relative to the location indicator, a position of the SR transition element relative to the location indicator; and
    displaying the plurality of SR assets and the SR transition element to the user at the respective positions of the plurality of SR assets and the SR transition element relative to the location indicator.

* * * * *